H. LANDIS.
SYSTEM OF SUPPLYING ELECTRICAL ENERGY ON SPECIAL TARIFFS.
APPLICATION FILED JAN. 23, 1912.
1,176,373. Patented Mar. 21, 1916.
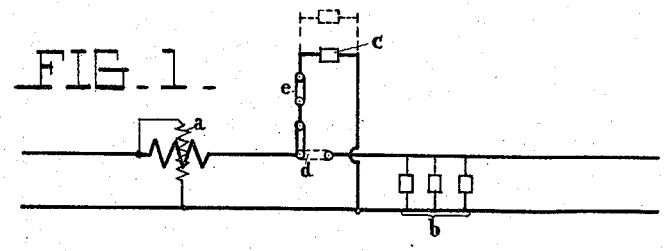
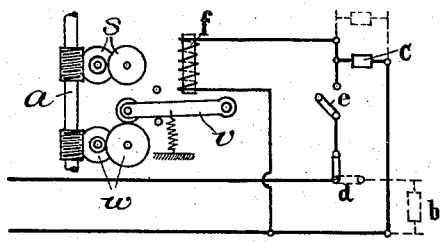
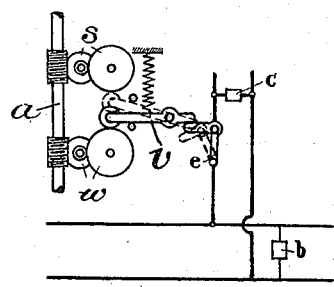

UNITED STATES PATENT OFFICE.

HEINRICH LANDIS, OF ZUG, SWITZERLAND.

SYSTEM OF SUPPLYING ELECTRICAL ENERGY ON SPECIAL TARIFFS.

1,176,373. Specification of Letters Patent. Patented Mar. 21, 1916.

Application filed January 23, 1912. Serial No. 672,954.

*To all whom it may concern:*

Be it known that I, HEINRICH LANDIS, a citizen of the Swiss Confederation, residing at Zug, Canton Zug, Switzerland, have invented new and useful Improvements in Systems of Supplying Electrical Energy on Special Tariffs, of which the following is a specification.

The capacity of an electrical supply station must be sufficient to meet the maximum possible demand which can be made at any time by the various classes of consumers supplied irrespective of the fact that the average load is considerably below this amount. The object aimed at is to improve the load factor by stimulating the use of electricity throughout the twenty four hours of the day and to attain this object a considerably reduced charge for the energy consumed during the day that is, when practically no current is used for illuminating purposes, is made. In order to determine the units of energy consumed, during the heavy-load periods on the station in the evening and during the rest of the day, meters with one or more integrating mechanisms are used for example double tariff- and multiple tariff meters. The great disadvantages of these tariff meters are, that they are expensive and need attendance and very often the amount of the consumption of energy in certain premises hardly warrants the installation of such a costly meter.

The object of the present invention is to simplify the means for recording the consumption of electrical energy in such a measure that the electrical supply company may install tariff meters even in premises where but small consumption occurs, for instance in private buildings, etc. This object is obtained by actuating the change-over device of the meter not by a time switch or clockwork, etc., but by a switch for turning on or turning off certain current consuming devices for instance lamps which are normally turned on during the period of the peak load of the station. The provision and the maintenance of clockworks, time switches or the like are done away with thereby the cost of supplying energy to consumers purchasing current under a tariff system is considerably reduced.

It has been proposed to use meters of the motor type having two field coils each of which being connected with certain current consuming devices. In such meters the energy consumed by the different devices is recorded at a predetermined rate which cannot be altered and the changing of the rate of charging the energy used is not effected by the switching on- or off of certain energy consuming devices.

The new system of metering may be executed in different ways. The measuring instrument or meter may have an integrating mechanism and it may be for instance a continuous current, an alternating current, or three phase-meter and the integrating mechanism may be a single-, double-, triple- or step-tariff recording train or a maximum demand indicator or prepayment tariff recording train; the measuring instrument may also be without an integrating train, for instance it may be a maximum demand switch or a maximum cut-out device.

Several modes of constructions are shown in a diagrammatical way in the accompanying drawings, in which:

Figure 1 is a diagrammatic view of a meter inserted between the means and two load circuits which it is desired to meter at different rates. Fig. 2, is a view partly diagrammatic showing means for changing the metering from one rate to the other, depending upon whether or not one of the circuits is in use. Fig. 3 is a view similar to Fig. 2 but showing a modified form of changing the rate of the meter.

In Fig. 1 $a$ denotes an electricity meter and $b$ and $c$ denote the current consuming devices connected with the meter in such a manner that the full amount of energy delivered is measured. Instead of providing the meter with a change-over clock or a time switch as usual until now for changing the rate of charging at predetermined hours the change-over device is controlled according to the invention by a switch for switching on or off certain energy consumers.

In the construction shown in Fig. 2, two switches $d$ and $e$ are provided. When the switch $e$ is closed and switch $d$ is in the position shown in full lines in Fig. 2, the circuit through the current consumer $c$ is closed and also the circuit through the magnet $f$. These two circuits can, of course, be opened by throwing the switch $e$ into the position as shown in Fig. 2. When, however, the switch $d$ is thrown into the dotted line position, then the circuit is closed through the current consumer $b$ and the circuits through the current consumer $c$ and the magnet $f$ are opened irrespective of the position of the switch $e$. Thus, if the switch $e$ is closed, the circuit through the current consumer $c$ and the magnet $f$ will be completed, serving to energize the said magnet; while, if the switch $d$ is thrown into dotted position, the circuit through the current consumer $b$ will be completed, also serving to deënergize the magnet $f$. During the period when the magnet $f$ is energized, the wheel on the rocking arm $o$, which acts as an armature for the magnet $f$, is pulled out of engagement with the lever $w$ and enters into engagement with the upper train $s$.

The change-over device may be controlled mechanically as shown in Fig. 3. The rocking change-over lever $v$ carrying on one end a gear rests with the other end on a switch lever $e$ which may be actuated by hand. The rocking lever is held by a spring. If the switch lever $e$ is pulled from the position shown in Fig. 3 in full lines into the position shown in the same figure in dotted lines the rocking lever $v$ is released and its gear is thrown into gear with the upper recording train. By returning the switch lever to its original position the gear on the lever $v$ is brought in mesh with the lower recording train. In each case the entire current consumed in the premises of the consumer is registered either on the high or on the low tariff. The switch lever may be arranged inside or outside the meter or at any convenient place.

In meters intended for use in connection with supply-in-bulk schemes only one integrating mechanism is provided; the latter may be thrown in or out of connection with the armature spindle. If for instance the lamps are switched off the rotations of the armature of the meter are not counted at all. In this case only current used for illumination is to be paid according to the readings of the meter, the other current has to be paid according to the bulk tariff.

In certain cases it may be of advantage to supply the energy at different rates but not to record the units consumed at the different rates. If electrical energy is to be sold without an integrating mechanism for instance by using any of the well known maximum demand switches or automatic cut out devices, or by using field coils and armatures the arrangement may be made as shown in Figs. 4 and 5, in which field coils and armatures are employed. The integrating mechanism is replaced by a device for breaking the circuit. As seen in Figs. 4 and 5 the field coils are subdivided and the current supplied to the current consuming devices $b$ and $c$ has to pass either the whole field coil or only a part thereof. The armature rotates at full speed when the current consumers $b$ are supplied with current, the speed of rotation is reduced by switching off the current consumers $b$ and switching on the consumers $c$. There may be more than two divisions of the field coils. This arrangement may be used in connection with any induction motor meter.

Having now particularly described and ascertained the nature of my invention I claim:

1. In a device of the kind described, a plurality of gear trains, a rocking arm, and a gear carried by said rocking arm and normally meshing with one of said trains, an electric switch, said arm lying in the path of movement of said switch and being movable by the movement of said switch to bring the gear on the arm into mesh with another of said gear trains.

2. In a device of the class described in combination, a plurality of gear trains, a rocking arm, and a gear carried by said rocking arm and normally meshing with one of said gear trains, a load circuit and a switch therefor, means controlled by said switch for displacing said arm whereby the gear carried thereby is brought into mesh with another of said gear trains, and means for returning said arm to its normal position.

In testimony whereof I affix my signature.

HEINRICH LANDIS.